United States Patent [19]

Tanaka et al.

[11] 4,336,983
[45] Jun. 29, 1982

[54] PHOTOGRAPHIC OBJECTIVE STABILIZED AGAINST CHANGE OF ANGULAR FIELD DURING FOCUSING

[75] Inventors: Kazuo Tanaka, Tokyo; Sadahiko Tsuji, Yokohoma, both of Japan

[73] Assignee: Canon Kabushiki Kaisha, Tokyo, Japan

[21] Appl. No.: 105,089

[22] Filed: Dec. 19, 1979

[30] Foreign Application Priority Data

Nov. 25, 1978 [JP] Japan ................................ 53-163546
Nov. 20, 1979 [JP] Japan ................................ 54-150244

[51] Int. Cl.³ ............................................ G02B 15/18
[52] U.S. Cl. .................................................. 350/427
[58] Field of Search ........................ 350/409, 431, 427

[56] References Cited

U.S. PATENT DOCUMENTS

| | | | |
|---|---|---|---|
| 3,682,534 | 8/1972 | Cook et al. | 350/427 |
| 4,099,845 | 7/1978 | Takesi | 350/427 |
| 4,278,331 | 7/1981 | Tanaka | 350/427 |
| 4,284,331 | 8/1981 | Tanaka | 350/427 |

Primary Examiner—John K. Corbin
Assistant Examiner—Rebecca D. Gass
Attorney, Agent, or Firm—Toren, McGeady & Stanger

[57] ABSTRACT

A photographic objective having a front lens group movable for focusing and a stationary rear lens group focusing whose back focal point is made coincident with the point of position of the exit pupil of the entire lens system to prevent the change in angular field of view in the object space from occurring during focusing.

3 Claims, 7 Drawing Figures

PHOTOGRAPHIC OBJECTIVE STABILIZED AGAINST CHANGE OF ANGULAR FIELD DURING FOCUSING

BACKGROUND OF THE INVENTION

This invention relates to photographic objectives having a mechanism for preventing the change of angular field of view during focusing, and, more particularly, to a zoom lens having the same mechanism.

One known form of focusing system of a photographic objective to arrange a movable lens group in front of a stationary lens group, or groups.

Particularly in the case of zoom lenses, because of their requirement of giving to the zoom part, consisting of a variator and a compensator, an object point (an image point of the focusing lens) at an always constant position independently of the object distance so that a constant image plane is maintained during zooming. For the focusing system, use is made of the so-called front-focusing arrangement.

A serious problem encountered at the present state of art of the focusing provision made in photographic objectives and particularly zoom lens systems is that the change of angular field of view in the object space during focusing should be either avoided, or at least minimized. Otherwise, this change in angular field results in the perplexing impression that zooming is taking place. This is undesirable to the visual sense.

In order to minimize the change in angular field during focusing, various focusing systems have been proposed. According to the proposal in U.S. Pat. No. 3,682,534, the focusing system or front lens group is constructed by two components both of which have negative refractive powers, and of which the frontmost, or the first is stationary during focusing, and only the second is made movable for focusing, thus minimizing the change of angular field. According to another proposal in U.S. Pat. No. 4,099,845, the front lens group is constructed by three components of negative, positive and positive powers, of which only the second is moved rearwardly as focusing takes place down to shorter object distances, thus obtaining a focusing system with advantage to reduce variation of the angular field. It is noticed that the provision of these systems primarily aims at achieving minimization of the diameter of the front lens member and shortening the object distance to which focusing can be effected, and that the reduction of variation of the angular field may be considered to result as a secondary product.

According to still another proposal of Japanese Patent Laid-Open Application Sho 53-6051, the front lens group is divided into two parts which are moved in certain differential relation to each other to effect focusing, thereby it being made possible to reduce the variation of the angular field to zero.

However, the above cited U.S. Pat. Nos. 3,682,532 and 4,099,845 though having allowed for the reduction of the variation of angular field still leave too great a residual to accept, and the above-cited Japanese Patent Laid-Open Application Sho 53-6051, though having achieved perfect stabilization against the change of angular field, has a disadvantage arising from the requirement of establishing the relationship in which the two focusing members are moved. This results in that the focusing control mechanism is made very complicated. Moreover, it has now been found in the latter connection that when applied to an objective lens system where the point of position of the exit pupil is largely spaced from the rear principal point of the entire system, an appreciable error is produced.

SUMMARY OF THE INVENTION

It is an object of the present invention to eliminate the above-mentioned conventional drawbacks and to provide a photographic objective with focusing means making it possible to maintain a constant angular field during focusing with the use of a simple focusing control mechanism.

The present invention concerns a photographic objective having the provision for maintaining a constant image plane despite the variation of the object distance made at the frontmost lens group thereof. According to the present invention, the back focal point of the residual lens system which is arranged rearwardly of that lens group movable for focusing is made coincident with the point of the exit pupil of the entire lens system so that the change of angular field in the object space during focusing is reduced to zero. That is, when a light beam parallel to the optical axis is caused to be incident upon the lens group which is stationary during focusing, this light beam reaches an image point, with which the point of the exit pupil of the entire lens system is made coincident.

In other words, the photographic objective according to the present invention is constructed so that a principal ray which is to pass through the center of the diaphragm aperture arranged rearwardly of the movable lens group for focusing is maintained always parallel with the optical axis of the lens system in a space as leaving from the movable lens group for focusing and arriving at the stationary lens group during focusing, while focusing is performed.

In one embodiment of the photographic objective according to the present invention to be described later, a first lens group movable for focusing, a second lens group intervening between said first lens group and a diaphragm, and a third lens group intervening between said diaphragm and the image plane are arranged on a common optical axis in this order from the front, whereby the back focal point of the combined lens system of the above-described second and third lens groups coincides with the point of the exit pupil of the entire lens system. That is, in the photographic objective according to the present invention, while focusing is being performed by moving the above-described first lens group, the principal ray which is to pass through the center of the above-described diaphragm is caused to travel from the above-described first lens group to the second lens group always in parallel with the optical axis of the lens system.

DESCRIPTION OF THE PREFERRED EMBODIMENT

Figure 1A:
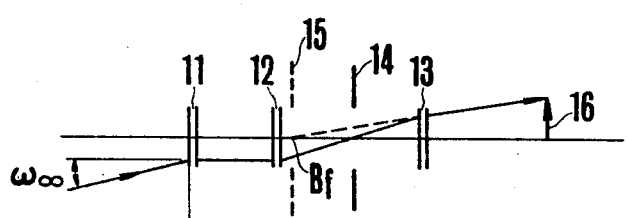
FIGS. 1(A) and 1(B) are schematic views showing the principle of the focusing method employed in a photographic objective of the present invention.
Figure 1B:
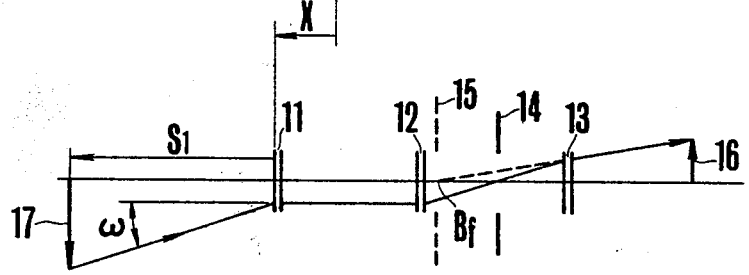

FIG. 1 shows the principle of a focusing method employed in a photographic objective according to the present invention. FIG. 1(A) shows that the objective is focused upon an infinitely distant object. In this patent application, this focusing position is taken as the starting-point. FIG. 1(B) shows that the objective is focused upon an object (17) at a finite distance ($S_1$).

In FIG. 1, the above-identified photographic objective comprises a first lens group 11 movable for focusing, a second lens group 12 stationary during focusing, a diaphragm 14, and a third lens group 13 which is always fixed. An image plane is indicated at 16. If a varifocal function is imparted to the above-described second lens group, this lens system constitutes a generally known zoom lens. 15 is an image of the diaphragm 14 by the third lens group 13, that is, an exit pupil. Here, let us define the angular field of view in the starting-point, that is, the angle of inclination of the principal ray incident upon the first lens group with the optical axis by $\omega_\infty$.

Here let us consider that the first lens group is axially moved by x to effect focusing upon an object 17 at a distance $S_1$ measured from the first lens group. The resultant angular field is denoted by $\omega$.

According to the present invention, the back focal point Bf of the combined optical system of the second and the third lens groups is equal to the position of the exit pupil of the entire system. That is, if a parallel light beam is incident upon the second lens group, this parallel light beam is transmitted by the second and the third lens groups to an image point with which the point of the exit pupil of the entire system coincides. This means that the principal ray (which is required to pass through the center of the diaphragm aperture to the image plane) takes a parallel position with the optical axis in a spaced defined by the rear surface of the first lens group from which it leaves and the front surface of the second lens group at which it arrives. Further, the diaphragm is located on the rear side of the movable lens group for focusing. For this reason, the exit pupil always takes a constant position.

From these two facts, it is proven that $\omega$ is made equal to $\omega_\infty$. That is, a photographic objective stabilized against the change in the angular field during focusing can be realized.

Stated thus far is what the condition is when the angular field remains unchanged. It will be appreciated that if the back focal point of the optical system that follows the first lens group nears the point of the exit pupil of the entire system, a remarkable improvement can be achieved over the conventional focusing system.

Examples of photographic objectives according to the present invention will next be shown.

The first example is one of a lens system identical in construction to the lens system shown in FIG. 1 and the data is given in the thin lens system.

| Lens Group | Power | Principal Point Interval |
|---|---|---|
| First Lens Group | −0.05 | |
| | | 5.0 |
| Second Lens Group | 0.1 | |
| | | 15.0 |
| Third Lens Group | 0.025 | |
| Focal Length of the Entire System: | | 12.8 |

-continued

| | |
|---|---|
| Back Focus: | 1.6 |
| Distance of Entrance Pupil Measured from the Front Principal Point of First Lens Group: | 20.0 |
| Back Focus of the Lens Group Comprised of the Second Lens Group and Third Lens Group, or Distance of the Exit Pupil of the Entire Lens System. Measured from the Rear Principal Point of Third Lens Group: | −5.714 |
| Distance from Diaphragm to the Front Principal Point of Third Lens Group: | 5.0 |

It is noted that when the distance is expressed, the value measured from the starting-point to the right or image plane is positive, and that measured to the left or object is given by a negative sign.

Figure 2:
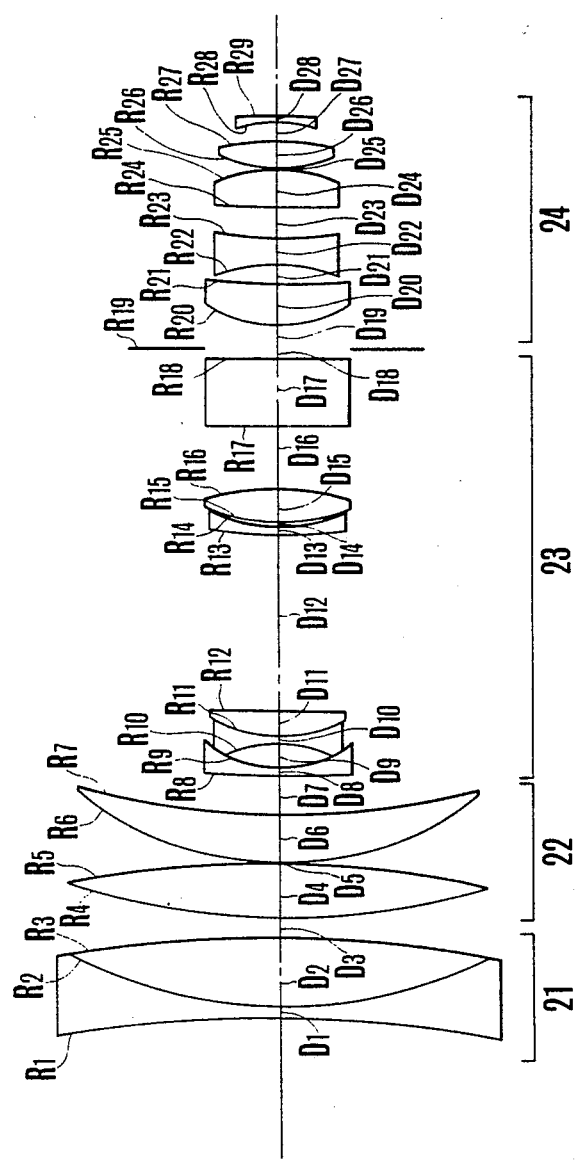
FIG. 2 is a lens block diagram of one embodiment of a photographic objective according to the present invention in the form of a zoom lens.
Figure 3:
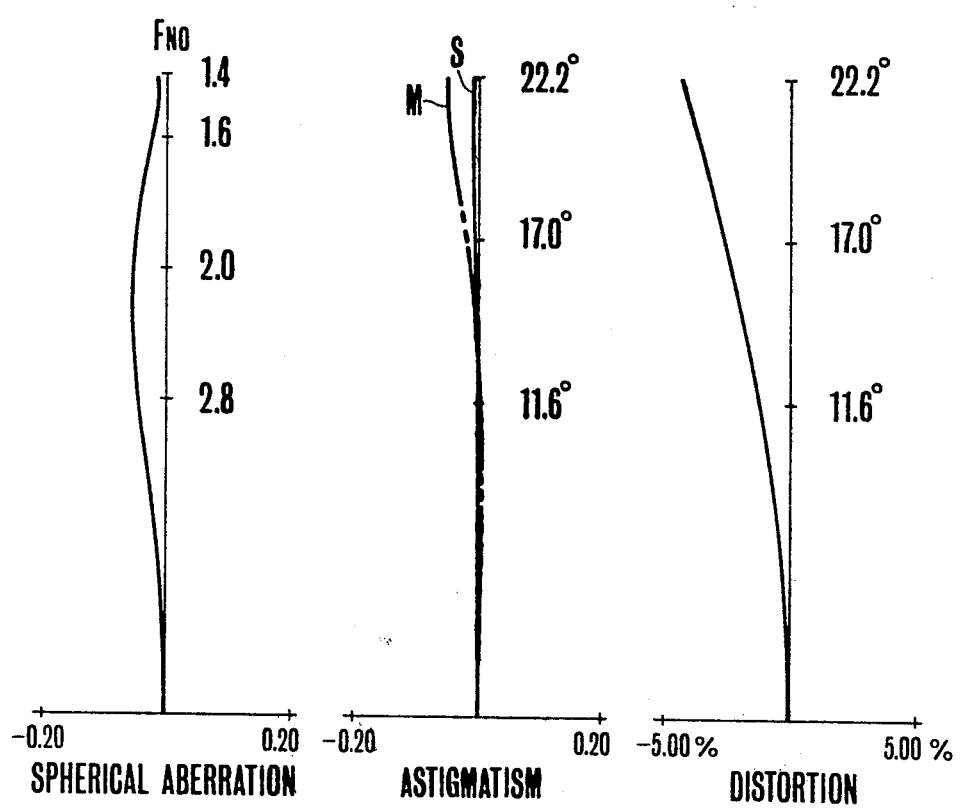
FIGS. 3 to 6 are graphic representations of the various aberrations of the zoom lens of FIG. 2 in four different focal length positions.
Figure 4:
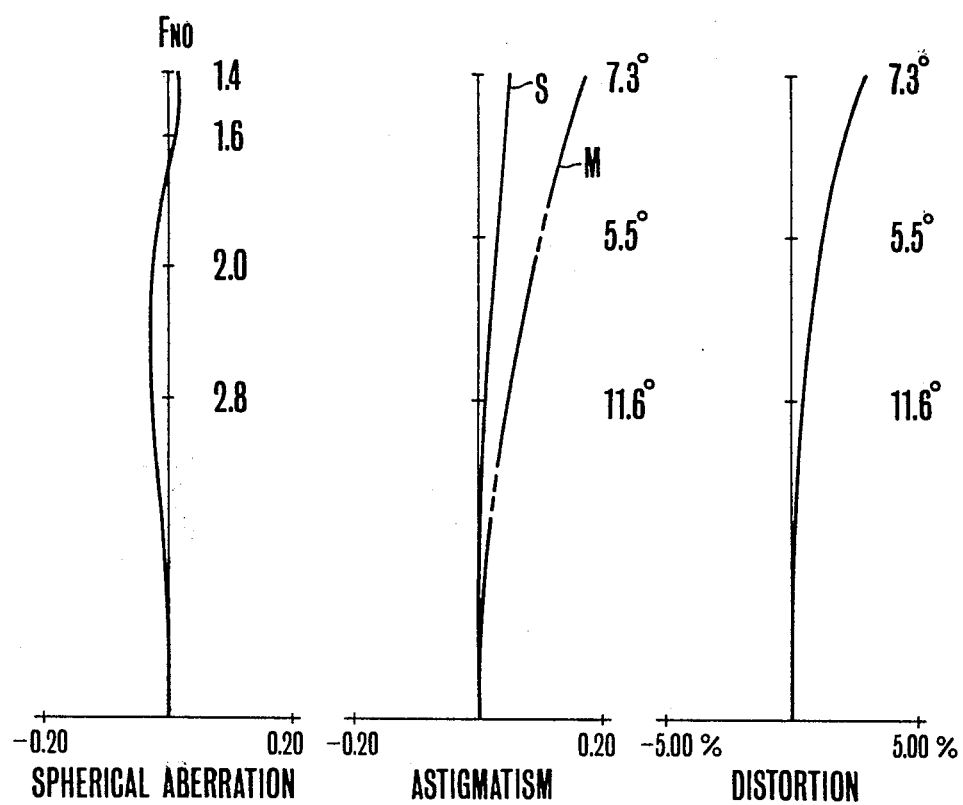
Figure 5:
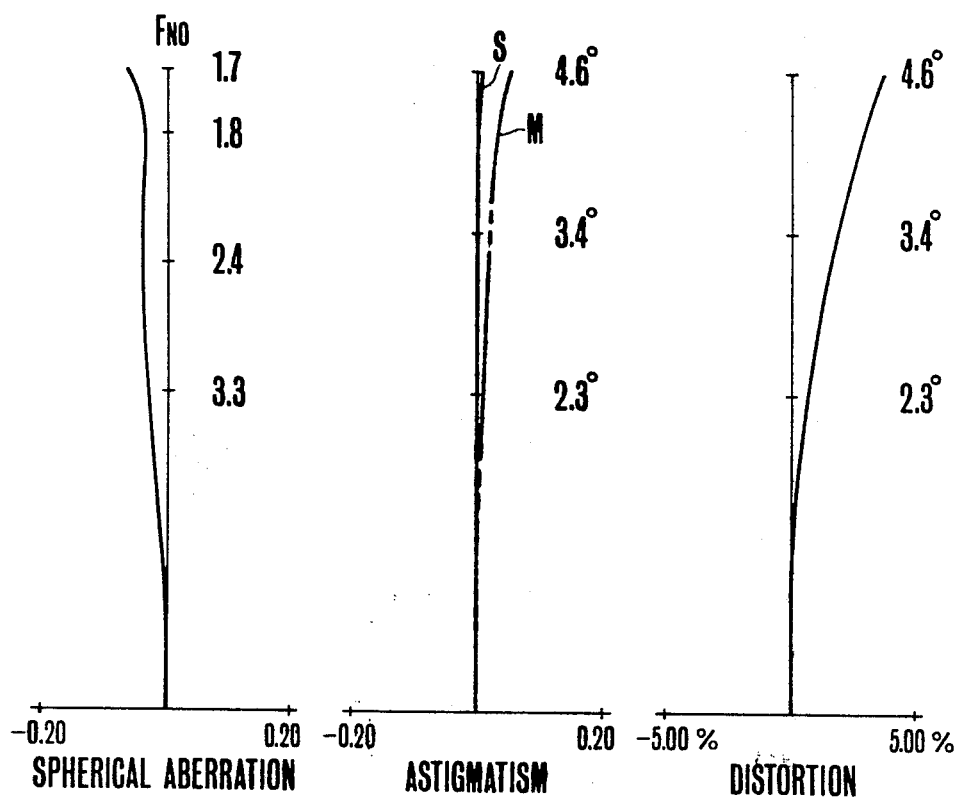
Figure 6:
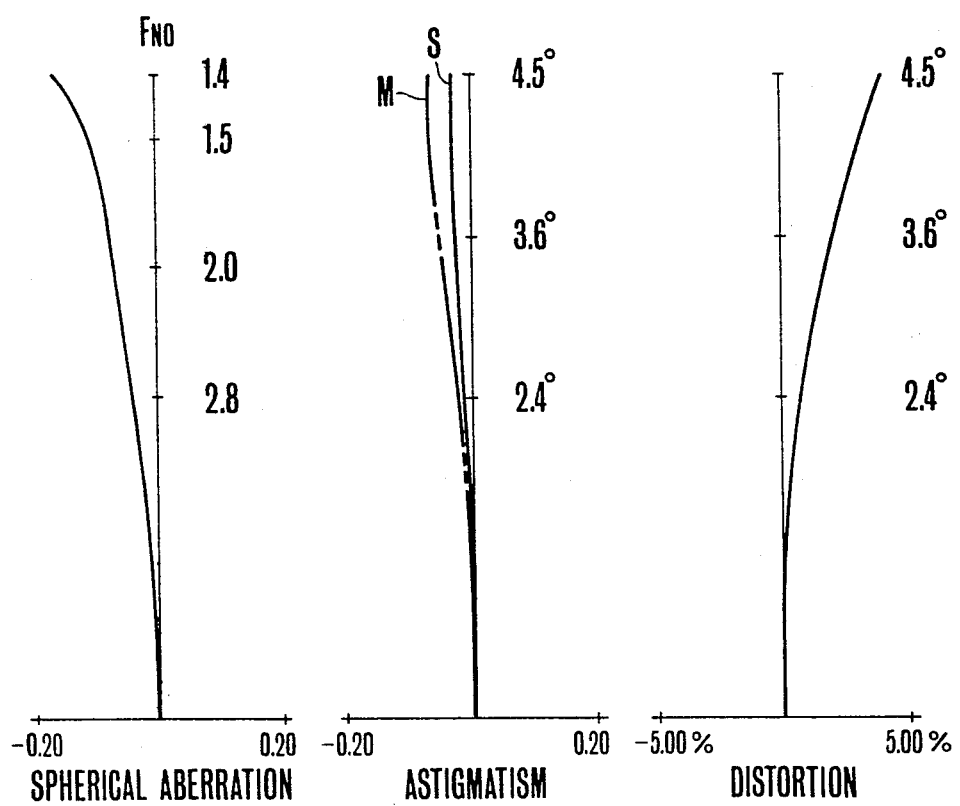

The second example is the practical thick lens design of a zoom lens according to the present invention of which the sectional view is given in FIG. 2, and the various aberrations (spherical aberration, astigmatism and distortion) are shown in FIGS. 3 to 6 for the focal length settings at 9.433, 29.880, 40.240 and 46.134 respectively. In FIG. 2, element 21 is a movable lens group for focusing; and elements 22, 23 and 24 are lens groups which are stationary during focusing. Zooming is performed by varying the axial air separations D7, D12 and D16. R19 is a diaphragm.

The data of the zoom lens shown in FIG. 2 are given in the following table for the radius of curvature, Ri, of the i−th surface, the axial air separation, or thickness, Di, between the i−th and (i+1)th surfaces, and the refractive indices N for the spectral d-line.

| Surface No. | R | D | N |
|---|---|---|---|
| 1 | −132.964 | 1.20 | 1.8052 |
| 2 | 47.729 | 7.98 | 1.5673 |
| 3 | −125.086 | 1.96 | 1.0 |
| 4 | 71.508 | 6.29 | 1.6968 |
| 5 | −114.888 | 0.20 | 1.0 |
| 6 | 34.212 | 5.40 | 1.6825 |
| 7 | 81.805 | Variable | 1.0 |
| 8 | 363.049 | 0.90 | 1.6935 |
| 9 | 12.195 | 2.61 | 1.0 |
| 10 | −16.671 | 0.90 | 1.6935 |
| 11 | 13.785 | 2.79 | 1.8051 |
| 12 | −7680.848 | Variable | 1.0 |
| 13 | 39.088 | 0.90 | 1.6476 |
| 14 | 17.070 | 0.54 | 1.0 |
| 15 | 18.367 | 3.78 | 1.5163 |
| 16 | −30.864 | Variable | 1.0 |
| 17 | 0.000 | 7.50 | 1.5163 |
| 18 | 0.000 | 1.14 | 1.0 |
| 19 | 0.000 | 2.50 | 1.0 |
| 20 | 13.405 | 4.64 | 1.6667 |
| 21 | 75.664 | 2.24 | 1.0 |
| 22 | −22.095 | 3.00 | 1.8051 |
| 23 | 33.763 | 3.41 | 1.0 |
| 24 | 125.654 | 4.20 | 1.6667 |
| 25 | −20.054 | 0.30 | 1.0 |
| 26 | 15.048 | 2.99 | 1.6584 |
| 27 | −35.230 | 2.26 | 1.0 |
| 28 | −14.829 | 0.80 | 1.8051 |
| 29 | −78.150 | | |

| Variable Separation | Focal Length | | | |
|---|---|---|---|---|
| | 9.433 | 29.880 | 40.240 | 46.134 |
| D7 | 4.605 | 20.605 | 22.505 | 23.205 |
| D12 | 19.951 | 9.136 | 3.657 | 0.541 |
| D16 | 7.298 | 2.113 | 5.692 | 8.108 |

The back focus of the lens group with the surfaces R4 to R29, or the distance of the exit pupil of the entire lens system, measured from the last lens surface (R29): −42.1181.

What is claimed is:

1. A photographic object having an angular field prevented from varying during focusing, comprising:
   a first lens group, counting from the front of the lens, movable for focusing;
   a second lens group and a third lens group which are stationary during focusing; and
   a diaphragm arranged between said second lens group and said third lens group, and a back focal point of combined lens system of said second and third lens groups being made coincident with the point of the exit pupil of the entire lens system so that the change of angular field in the object space during focusing is reduced.

2. A photographic objective as described in claim 1, wherein at least one of the lens members constituting said second lens group is made movable for zooming.

3. A photographic objective as described in claim 2, said lens system having the following numerical data:

| Surface No. | R | D | N |
| --- | --- | --- | --- |
| 1 | −132.964 | 1.20 | 1.8052 |
| 2 | 47.729 | 7.98 | 1.5673 |
| 3 | −125.086 | 1.96 | 1.0 |
| 4 | 71.508 | 6.29 | 1.6968 |
| 5 | −114.888 | 0.20 | 1.0 |
| 6 | 34.212 | 5.40 | 1.6825 |
| 7 | 81.805 | Variable | 1.0 |
| 8 | 363.049 | 0.90 | 1.6935 |
| 9 | 12.195 | 2.61 | 1.0 |
| 10 | −16.671 | 0.90 | 1.6935 |
| 11 | 13.785 | 2.79 | 1.8051 |
| 12 | −7680.848 | Variable | 1.0 |
| 13 | 39.088 | 0.90 | 1.6476 |
| 14 | 17.070 | 0.54 | 1.0 |
| 15 | 18.367 | 3.78 | 1.5163 |
| 16 | −30.864 | Variable | 1.0 |
| 17 | 0.000 | 7.50 | 1.5163 |
| 18 | 0.000 | 1.14 | 1.0 |
| 19 (diaphragm) | 0.000 | 2.50 | 1.0 |
| 20 | 13.405 | 4.64 | 1.6667 |
| 21 | 75.664 | 2.24 | 1.0 |
| 22 | −22.095 | 3.00 | 1.8051 |
| 23 | 33.763 | 3.41 | 1.0 |
| 24 | 125.654 | 4.20 | 1.6667 |
| 25 | −20.054 | 0.30 | 1.0 |
| 26 | 15.048 | 2.99 | 1.6584 |
| 27 | −35.230 | 2.26 | 1.0 |
| 28 | −14.829 | 0.80 | 1.8051 |
| 29 | −78.150 | | 1.0 |

| Variable Separation | Focal Length | | | |
| --- | --- | --- | --- | --- |
| | 9.433 | 29.880 | 40.240 | 46.134 |
| $D_7$ | 4.605 | 20.605 | 22.505 | 23.205 |
| $D_{12}$ | 19.951 | 9.136 | 3.657 | 0.541 |
| $D_{16}$ | 7.298 | 2.113 | 5.692 | 8.108 | wherein the reference symbols R1 through R29 represent radii of curvature on the respective surfaces, the reference symbols D1 through D28 designate thicknesses of the respective lens elements and air spaces therebetween, and the reference symbols N1 through N29 denote refractive indices of the respective lens elements.

* * * * *

UNITED STATES PATENT OFFICE
CERTIFICATE OF CORRECTION

Patent No. 4,336,983  Dated June 29, 1982

Inventor(s) Kazuo Tanaka, et al

It is certified that error appears in the above-identified patent and that said Letters Patent are hereby corrected as shown below:

On the Title page,

[30]  Foreign Application Priority Data
Dec. 25, 1978 [JP]  Japan.....................53-163546
Nov. 20, 1979 [JP]  Japan.....................54-150244

Signed and Sealed this

Fifth Day of October 1982

[SEAL]

Attest:

GERALD J. MOSSINGHOFF

Attesting Officer    Commissioner of Patents and Trademarks